US010375368B2

(12) United States Patent
Silverstein

(10) Patent No.: US 10,375,368 B2
(45) Date of Patent: Aug. 6, 2019

(54) IMAGE DATA CONVERSION

(71) Applicant: Apple Inc., Cupertino, CA (US)

(72) Inventor: D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/198,376

(22) Filed: Jun. 30, 2016

(65) Prior Publication Data

US 2018/0005352 A1 Jan. 4, 2018

(51) Int. Cl.

| | |
|---|---|
| ***H04N 9/04*** | (2006.01) |
| ***G06T 3/40*** | (2006.01) |
| ***H04N 9/76*** | (2006.01) |
| ***G06T 1/20*** | (2006.01) |
| ***H04N 5/33*** | (2006.01) |
| ***H04N 5/365*** | (2011.01) |

(52) U.S. Cl.

CPC ................. *H04N 9/76* (2013.01); *G06T 1/20* (2013.01); *G06T 3/4015* (2013.01); *G06T 3/4084* (2013.01); *H04N 5/332* (2013.01); *H04N 5/365* (2013.01); *H04N 9/045* (2013.01)

(58) Field of Classification Search

None

See application file for complete search history.

(56) References Cited

U.S. PATENT DOCUMENTS 7,002,627 B1 2/2006 Raffy et al.
RE42,555 E 7/2011 Lin et al.
7,986,358 B1 * 7/2011 Blais-Morin ............. G06T 1/00 348/273
2008/0055436 A1 3/2008 Sarwari et al.
2011/0176036 A1 * 7/2011 Getman ................. H04N 9/045 348/273
2013/0147991 A1 * 6/2013 Hamasaki ............. H04N 5/265 348/239

* cited by examiner

*Primary Examiner* — Mark T Monk
(74) *Attorney, Agent, or Firm* — Fenwick & West LLP

(57) ABSTRACT

Embodiments of the present disclosure relate to an apparatus for converting image data from a Bayer format image to a four-plane image format using two memory channels. An example apparatus includes an interface for receiving the Bayer image including repeating pixel groups, where each pixel group includes a first pixel type, a second pixel type, a third pixel type, and a fourth pixel type. The apparatus also includes a memory and a circuit to write the Bayer image to the memory as four-plane data. The four-plane data includes pixels of the first type and the third type in the Bayer image that are written via the first memory channel, and pixels of the second type and the fourth type in the Bayer image that are written via the second memory channel. Embodiments also relate to converting three sensor image data to a Bayer format image using the two memory channels.

14 Claims, 10 Drawing Sheets

| R | Gb |
| --- | --- |
| Gr | B |

FIG. 7C

| G | B |
| --- | --- |
| R | IR |

FIG. 7B

| G | B |
| --- | --- |
| R | W |

FIG. 7A

IMAGE DATA CONVERSION

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipeline is often implemented as a hardware component separate from the CPU and dedicated to perform one or more image processing algorithms.

Images processed by the image processing pipeline may include several image data formats such as Bayer data format and three sensor data format (e.g., captured by three separate color sensors). Image data corresponding to different image formats may need to be processed using different processing algorithms thereby increasing the complexity of image processing pipeline.

SUMMARY

Embodiments of the present disclosure relate to an apparatus and a method for converting image data from a Bayer format image to a four-plane image format using two memory channels such as direct memory access (DMA) channels. Embodiments also relate to reading the converted four-plane image format data back to the Bayer format image using the two memory channels.

In one embodiment, the apparatus includes an interface for receiving the Bayer image in a format that includes repeating pixel groups, where each pixel group is spread across a plurality of corresponding pixel rows and includes a first pixel type, a second pixel type, a third pixel type, and a fourth pixel type. The apparatus also includes a memory and a circuit to write the Bayer image to the memory as four-plane data via a first memory channel and a second memory channel. The four-plane data written to the memory includes pixels of the first type and pixels of the third type in the Bayer image that are written via the first memory channel. The four-plane data written to the memory also includes pixels of the second type and pixels of the fourth type in the Bayer image that are written via the second memory channel.

In one embodiment, the four pixel types of each pixel group of the Bayer image include a Red pixel for the first pixel type, Green pixel for each of the second pixel type and the third pixel type, and a Blue pixel for the fourth pixel type.

In one embodiment, the four pixel types of each pixel group of the Bayer image include a Red pixel for the second pixel type, Green pixel for each of the first pixel type and the fourth pixel type, and a Blue pixel for the third pixel type.

In one embodiment, the four pixel types of each pixel group of the Bayer image include a Red pixel for the first pixel type, Green pixel for each of the second pixel type, White pixel for the third pixel type, and a Blue pixel for the fourth pixel type.

In one embodiment, the four pixel types of each pixel group of the Bayer image include a Red pixel for the first pixel type, Green pixel for each of the second pixel type, infrared (IR) pixel for the third pixel type, and a Blue pixel for the fourth pixel type.

In one embodiment, odd numbered pixel rows of the plurality of corresponding pixel rows of the Bayer image include alternating Red and Green pixels, and even numbered pixel rows of the plurality of corresponding pixel rows of the Bayer image include alternating Green and Blue pixels.

In one embodiment, the circuit further writes odd position pixels of each pixel row of the Bayer image to the memory via the first memory channel and writes even position pixels of each pixel row of the Bayer image to the memory via the second memory channel.

In one embodiment, the memory further includes two separate address spaces, where each address space includes multiple sub-blocks. Each sub-block of the multiple sub-blocks may store a contiguous data corresponding to one pixel type of the image written to the memory, where the one pixel type may be one of the first pixel type, the second pixel type, the third pixel type, and the fourth pixel type.

In one embodiment, the circuit is further configured to read pixels of the first type and the third type via the first memory channel, read pixels of the second type and fourth type via the second memory channel, and convert the read pixels to an image in the format that comprises repeating pixel groups, where the format is a Bayer format.

Embodiments further relate to converting three sensor image data to a Bayer format image using the two memory channels. In one embodiment, the apparatus includes an interface for receiving a first image including pixels of a first type, a second image including pixels of a second type, a third image including pixels of a third type. The apparatus also includes a circuit for generating a Bayer format image from the first image, the second image, and the third image.

In one embodiment, the apparatus further includes a Red image sensor for capturing the first image including Red pixels, a Green image sensor for capturing the second image including Green pixels, and a Blue image sensor for capturing the third image including Blue pixels.

In one embodiment, the circuit further generates the Bayer format image by combining data corresponding to pixel rows of the first image and the second image to generate odd numbered pixel rows of the Bayer format image, and combining data corresponding to pixel rows of the second image and the third image to generate even numbered pixel rows of the Bayer format image.

Embodiments also relate to a non-transitory computer-readable medium storing a digital representation of an example apparatus for converting image data from a Bayer format image to a four-plane image format, reading the converted four-plane image format data back to the Bayer format image, and converting three sensor image data to a Bayer format image.

BRIEF DESCRIPTION OF THE DRAWINGS

FIGS. 7A-7C illustrate modified Bayer image data formats, according to one embodiment.

Figure 1:
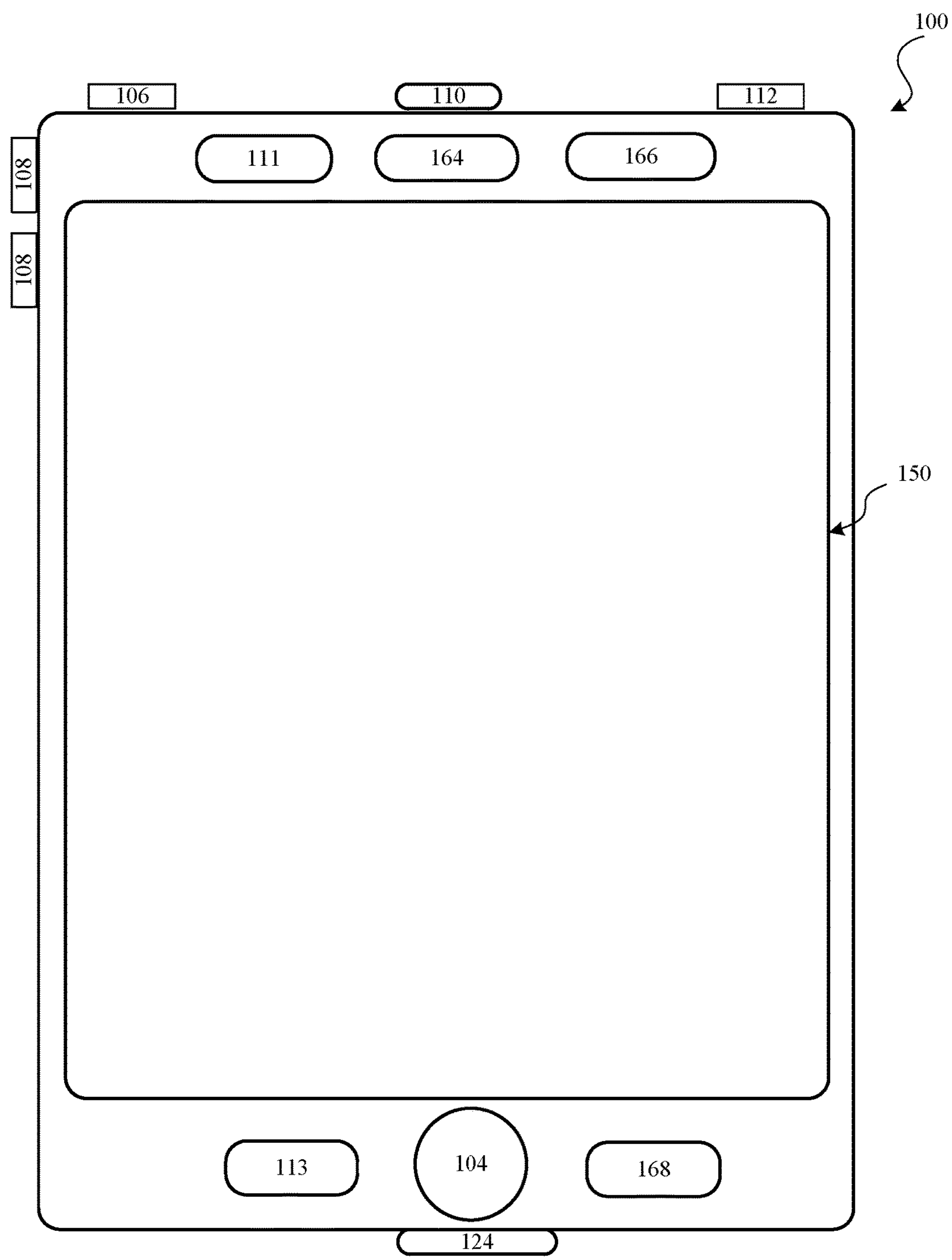
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

An embodiment of the present disclosure relates to image data conversion of images captured by an image sensor to a four-plane data format to increase an image signal processor's compatibility with various image data formats. For example, image data of images captured in a Bayer data format is converted into a four-plane data format, where each plane of data corresponds to a different pixel type data of the Bayer data. The three sensor data format of images captured using three separate color sensors is converted to Bayer data, which can further be converted to the four-plane data for further image processing.

The image data conversion from the Bayer data to the four-plane data includes receiving image data in the Bayer data, where the received image data includes repeating pixel groups. Each pixel group may be a 2×2 block of pixels that is spread across a plurality of corresponding pixel rows. Each pixel group can includes a first pixel type such as Red pixels, a second pixel type such as Green pixels of odd pixel rows, a third pixel type such as Green pixels of even pixel rows, and a fourth pixel type such as Blue pixels. The conversion also includes writing the image data to a memory via a first memory channel and a second memory channel, where the pixels of the first type and the third type of the image are written via the first memory channel, and the pixels of the second type and the fourth type in the image are written via the second memory channel.

The image data conversion from the three sensor data to the Bayer data includes receiving a first image including Red sensor data, a second image including Green sensor data, and a third image including Blue sensor data. The conversion also includes writing image data corresponding to the first image, the second image, and the third image to a memory via a first memory channel and a second memory channel, where the Red sensor data and the Green sensor data is written to the memory via the first memory channel, and where the Green sensor data and the Blue sensor data is written to the memory via the second memory channel.

Image data conversion from either Bayer data format to four-plane data format or three sensor data format to Bayer data format offers several advantages. Such conversion enables the same image signal processor (ISP) to be compatible with images captured in a variety of image data formats such as three sensor data format, Bayer data format, or any of the modified Bayer data formats as illustrated in FIGS. 7A-7C. By converting any image captured in any format into the four-plane data format, an ISP designed to process the four-plane data format can also process image data captured in any of the above-mentioned data formats. Also, multiple sensors can be combined and processed as if they came from a conventional Bayer camera. For example, image data captured used three charge-coupled device (CCD) camera could be converted to Bayer format data. Moreover, converting image data formats using two memory channels (e.g., two DMA channels) over a single channel or even four channels have advantages. For example, using two channels provides increased speed and efficiency compared to a single channel. When compared to four channels, the two-channel approach reduces resource overhead (e.g., memory buffers 414).

Figure 5:
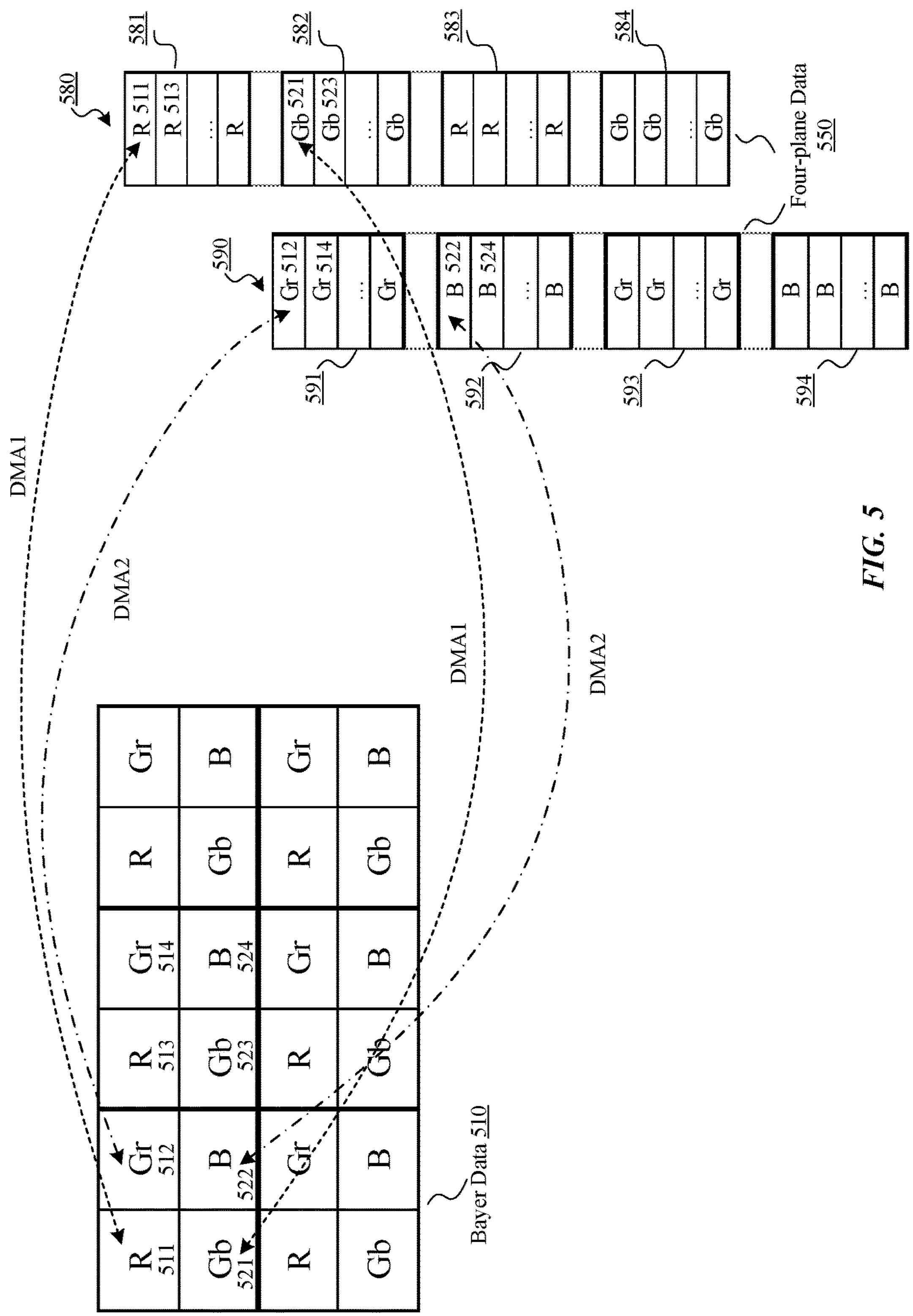
FIG. 5 is a block diagram illustrating additional details for converting image data from Bayer data format to four-plane data format, according to one embodiment.

The term "Bayer format" or "Bayer data format" described herein refers to an image data format where the image data includes repeating pixel groups as shown in Bayer data 510 of FIG. 5. Here, each pixel group includes four pixels arranged in a 2×2 block of pixels. For example, Red pixel 511, Green pixel 512, Green pixel 521, and Blue pixel 522 form a pixel group. The Bayer data is generated using an image sensor that includes a Bayer color filter array (CFA) to captures light using different color filters.

The term "four-plane data format" refers to a data format where image data associated with different pixel types is stored as different planes of data. Here, a plane of data refers to a 2 dimensional matrix of data corresponding to a particular type of pixel, such as a color of the pixel. For example, image data including four types of pixels is stored as four separate planes of data where each plane of data corresponds to each pixel type. For example, the four-plane data 550 of FIG. 5 converted from the Bayer data 510 includes four planes of data. As discussed above, each pixel group of the Bayer data 510 includes a Red pixel, Green pixel Gr, Green pixel Gb, and Blue pixel. Each plane of data of the four-plane data 550 includes image data corresponding to one of the four pixel types of the pixel groups of the Bayer data 510. For example, a first plane of data includes all Red pixels of the Bayer data 510, a second plane of data includes all Green pixels (Gr) of odd pixel rows of the Bayer data 510, a third plane of data includes all Green pixels (Gb) of the even pixel rows of the Bayer data 510, and a fourth plane of data includes all Blue pixels of the Bayer data 510. For the example four-plane data 550, each individual plane of data is stored across several memory sub-blocks, where each memory sub-block corresponds to a pixel row of Bayer data 510. For example, the plane of data for the Red pixels includes memory sub-block 581 corresponding to the first pixel row of Bayer data 510 and memory sub-block 583 corresponding to the third pixel row of Bayer data 510.

Figure 9:
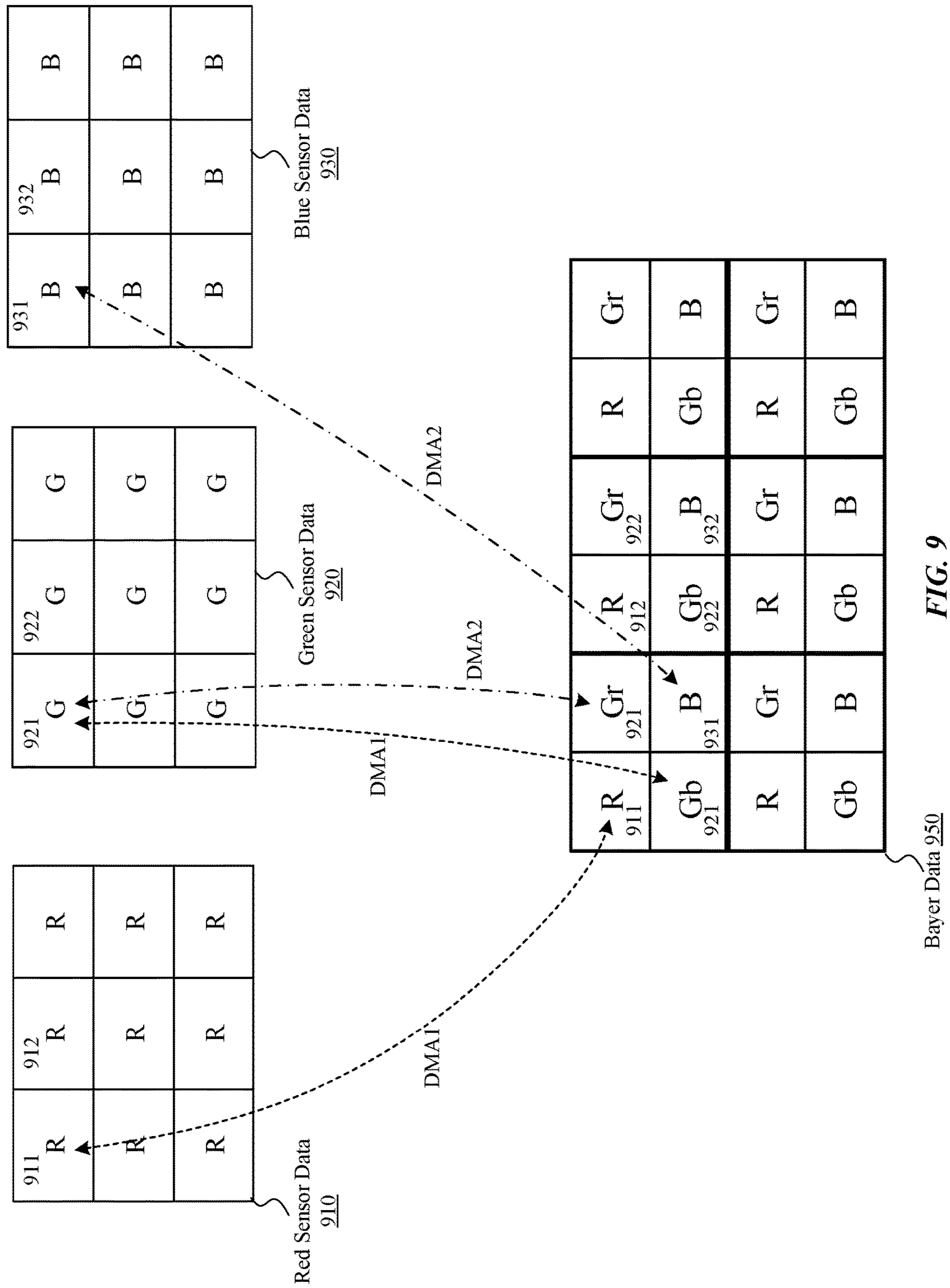
FIG. 9 is a block diagram illustrating additional details for converting image data from three sensor data format to Bayer data format, according to one embodiment.

The term "three sensor data" described herein refers to image data corresponding to an image captured using three separate color sensors such as a Red color sensor, Green color sensor, and Blue color sensor. An example three sensor data is shown in FIG. 9 as image data corresponding to three images, Red sensor data 910, Green sensor data 920, and Blue sensor data 930, captured by the three sensors.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
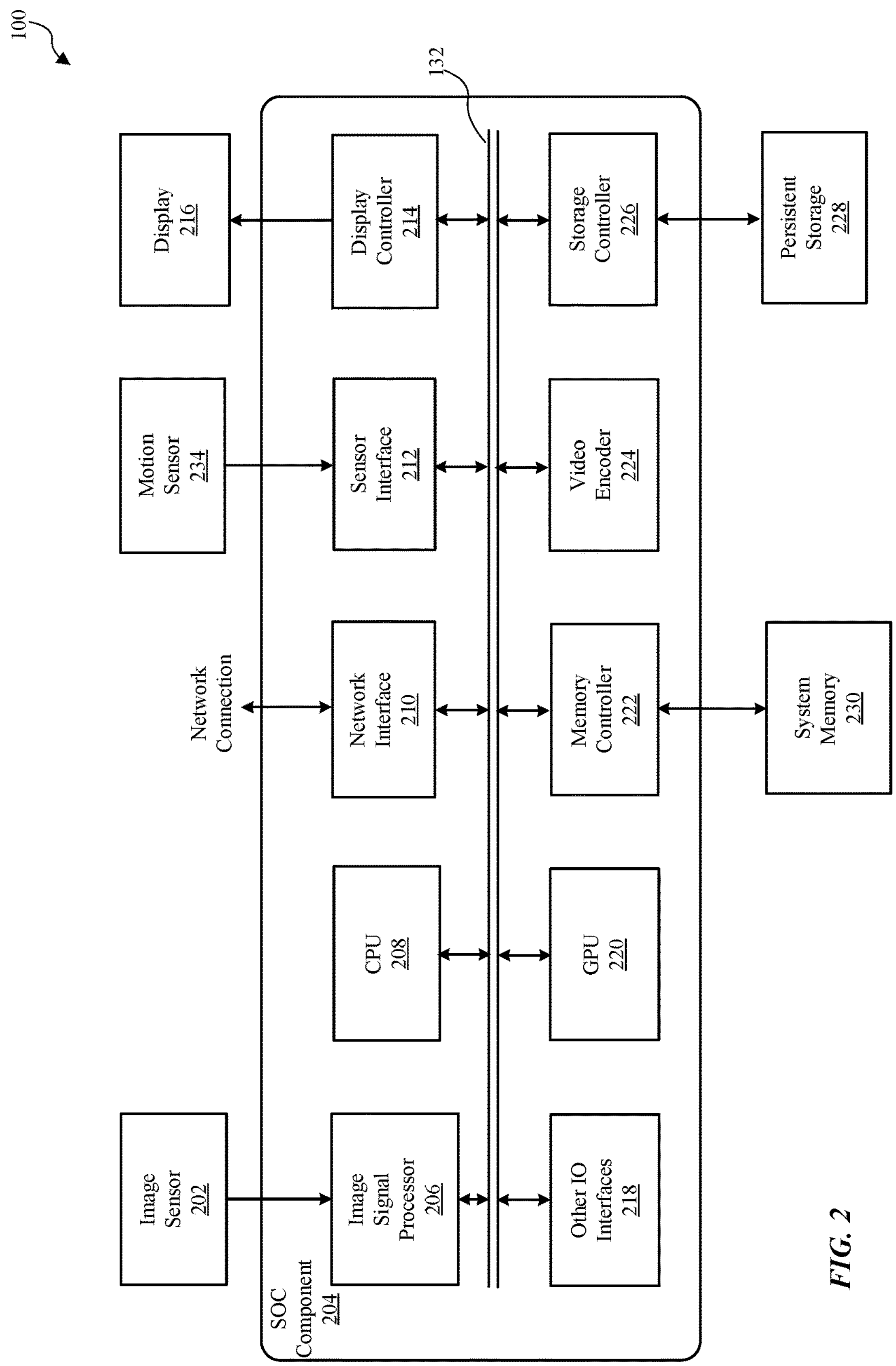
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipeline

Figure 3:
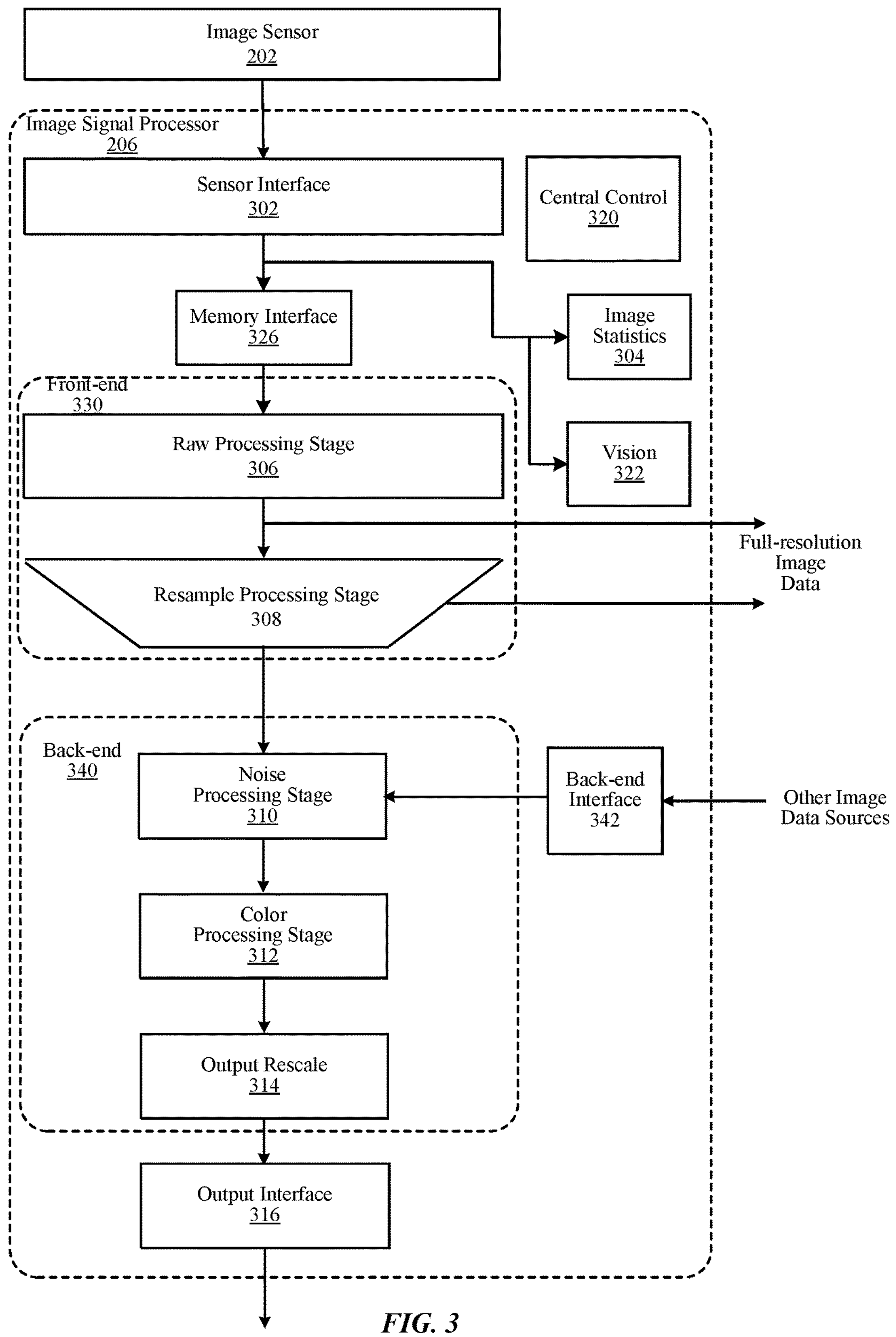
FIG. 3 is a block diagram illustrating image processing pipeline implemented using an image signal processor, according to one embodiment.

FIG. 3 is a block diagram illustrating image processing pipeline implemented using ISP 206, according to one embodiment. In the embodiment of FIG. 3, ISP 206 is coupled to image sensor 102 to receive raw image data. ISP 206 implements an image processing pipeline which may include a set of stages that process image information from creation, capture or receipt to output. ISP 206 may include, among other components, sensor interface 302, memory interface 326, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Memory interface module 326 receives image data from the sensor interface module 302 and provides the image data to the front-end pipeline stages 330. In one embodiment, the memory interface module 326 provides the image data to the image statistics module 304 and the vision module 322. Memory interface module includes memory logic (e.g., DMA logic) and planarizers such as planarizers 410 described below with reference to FIG. 4.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format or RGB format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. Convolution is heavily used tools in image/video processing and machine vision. Convolution may be performed, for example, to generate edge maps of images or smoothen images. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format. Alternatively, the back-end interface 342 may convert a Bayer data format to a four-plane data format, the four-plane data format to the Bayer data format, or a three sensor data format to the Bayer data format.

Back-end pipeline stages 340 processes image data according to a particular full-color format (e.g., YCbCr 4:4:4 or RGB). In some embodiments, components of the back-end pipeline stages 340 may convert image data to a particul4ar full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color channel output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Bayer Format to Four Color Plane Format

Figure 4:
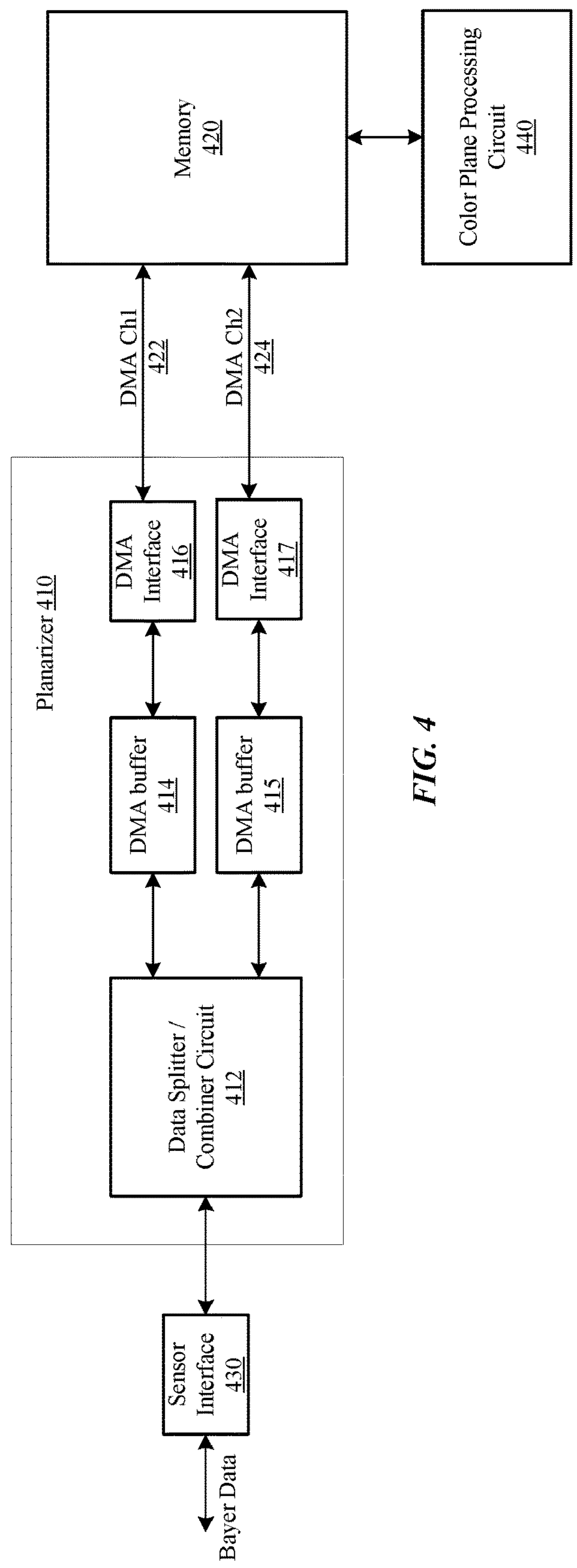
FIG. 4 is a block diagram illustrating conversion of image data from Bayer data format to four-plane data format, according to one embodiment.

FIG. 4 is a block diagram illustrating conversion of image data from Bayer data format to four-plane data format, according to one embodiment. The block diagram includes a planarizer circuit 410, a memory 420, a sensor interface circuit 430, and a color plane processing circuit 440. The planarizer 410 receives image data in the Bayer data format and writes the image data in the four-plane data format. The planarizer 410 can also read the four-plane data and convert it to the Bayer data format. The planarizer 410 may be located within memory interface module 326 described above with reference to FIG. 3 In some embodiments, the functionality of the planarizer circuit 410 may be implemented in hardware, firmware, software, or some combination thereof.

The planarizer 410 includes a data splitter/combiner circuit 412, a pair of DMA buffers 414 and 415, and a pair of DMA interfaces 416 and 417. The data splitter/combiner circuit 412 either splits the Bayer data into different planes of data or alternatively combines the different planes of data into the Bayer data as described below.

In one embodiment where the planarizer 410 converts the image data from the Bayer data format to the four-plane data format, the planarizer 410 receives the image data via the sensor interface 430. The sensor interface 430 may be similar to the sensor interface 302 and may receive the image data from either the image sensor 202 or from a memory (e.g., system memory 230 or persistent storage 228). The received Bayer data includes a plurality of pixel rows and pixel columns, where the odd numbered pixel rows include alternate Red and Green pixels, and the even numbered pixel rows includes alternate Green and Blue pixels as shown in the Bayer data 510 in FIG. 5. The planarizer 410 converts the Bayer data into the four-plane data on a pixel row basis as described below.

For a given pixel row, the data splitter/combiner circuit 412 splits the pixel row data into pixel data of the same color. For odd pixel rows, Red pixel data is split from Green pixel data. For even pixel rows, Green pixel data is split from and Blue pixel data. The split pixel data is buffered in one of the DMA buffers 414 and 415.

DMA interface 416 is coupled to DMA channel 1 422 and reads and writes image data to the memory 420 via DMA channel 1 422. DMA interface 417 is coupled to DMA channel 2 424 and reads and writes image from to the memory 424 via DMA channel 2 424. DMA channel 1 422 and DMA channel 2 424 represent separate physical channels through which data can be transferred with the memory 420. For example, DMA channel 1 may be one set of wires and DMA channel 2 may be another set of wires.

When a complete row of image data has been stored into the DMA buffers 414 and 415, the DMA interface 416 writes the image data in DMA buffer 414 to memory 420. Also, DMA interface 417 writes the image data in DMA buffer 415 to memory 420. In other embodiments, the DMA buffers 416 and 417 may write data at other times, such as when the buffers 414 and/or 415 store a threshold amount of data.

The process of splitting the pixel row data, buffering the split data, and writing the buffered data is repeated for every pixel row of the Bayer data. In one embodiment, each of the buffers 414 and 415 has a large enough to hold pixel data equal to one half of a pixel row of image data such that one full pixel row of image data may be written to memory in each write operation.

Color plane processing circuit 440 reads the image data in the four-plane data format from the memory 420 and performs further processing on the individual color planes. For example, the color plane processing circuit 440 applies one or more digital image processing algorithms to one color plane of data at a time to process the image data further. The image processing algorithms are typically designed to process non-Bayer format data. Converting the Bayer format image into four separate planes of data enables the color plane processing circuit 440 to process image data one color plane at a time using these algorithms that are not compatible with Bayer data. After processing the four-plane data, the color plane processing circuit 440 writes back the processed image data back to the memory 420 for additional image processing. One of the advantages for converting Bayer data format to four-plane data format is to make compression of image data easier. Compression formats, such as JPEG, generally do not support Bayer data format. By converting the Bayer data to four-plane data, processing image data for data compression is easier as some GPU and CPU operations are simplified while operating on planar data. As another example, a face detection algorithm might work well on a single plane of green pixel data.

The planarizer 410 can also read the image data that is stored in the memory 420 in four-plane data format, and convert the data to the Bayer data format. The planarizer 410 receives the image data from the memory 420 over the DMA interfaces 416 and 417 via the DMA channels 422 and 424. The data splitter/combiner circuit 412 accesses the data corresponding to each plane of the four-plane data that is stored at various memory blocks to combine the data into the Bayer data format.

The process of converting the image data from the Bayer data format to the four-plane data format and vice versa is further described below with reference to FIG. 5.

FIG. 5 is a block diagram illustrating additional details for converting image data from Bayer data format to four-plane data format, according to one embodiment. FIG. 5 shows the Bayer data 510, the four-plane data 550, and the two DMA channels, DMA1 and DMA2, over which the data is transferred. FIG. 5 also shows two blocks within the memory 420, memory block 580 and memory block 590, where the four-plane data 550 is stored. The two memory blocks 580 and 590 are two separate blocks of memory located at two separate address spaces.

The Bayer data 510 includes repeating pixel groups, where each pixel group includes a 2×2 block pixels such as a Red pixel R 511, two Green pixels Gr 512 and Gb 521, and a Blue pixel B 522. The Bayer data 510 shown in FIG. 5 includes a plurality of pixel rows and pixel columns, where the odd numbered pixel rows include alternate Red and Green pixels, and the even numbered pixel rows includes alternate Green and Blue pixels.

In one embodiment, the planarizer 410 converts the Bayer data 510 into four-plane data 550 via two DMA channels, DMA1 and DMA2. For each pixel row of the Bayer data 510, the planarizer 410 writes pixel data corresponding to either Red and Green pixels or Green and Blue pixels to two separate locations in a memory (e.g., memory 420) via DMA channels, DMA1 and DMA2. For odd numbered pixel rows, the planarizer 410 writes pixel values corresponding to the Red pixels to a first memory block via DMA1 channel. For example, Red pixels 511 and 513 of the first pixel row are written to consecutive memory locations of the first memory block 580, and specifically to a first sub-block 581 within the first memory block 580. The planarizer 410 writes all Red pixel values of the first pixel row to consecutive memory locations of the first memory sub-block 581. For the odd numbered pixel rows, the planarizer 410 also writes pixel values corresponding to the Green pixels to the second memory block 590 via DMA2 channel. For example, Green pixels 512 and 514 of the first pixel row are written to consecutive memory locations of the second memory block 590, and specifically to a first sub-block 591 within the second memory block 590. The planarizer 410 writes all Green pixel values of the first pixel row to consecutive memory locations of the first memory sub-block 591. The planarizer 410 writes the Red pixels and the Green pixels of each odd numbered pixel rows simultaneously. For example, while the Red pixels are written via DMA1 channel to the sub-block 581, the Green pixels are simultaneously written via DMA2 channel to the sub-block 591.

For even numbered pixel rows, the planarizer 410 writes pixel values corresponding to the Green pixels to the first memory block 580 via DMA1 channel, and writes pixels corresponding to the Blue pixels to the second memory block 590 via DMA2 channel. For example, Green pixels 521 and 523 of the second pixel row are written to consecutive memory locations of a second sub-block 582 of the first memory block 580. Blue pixels 522 and 524 of the second pixel row are written to consecutive memory locations of a second sub-block 592 of the second memory block 590. The planarizer 410 writes all Green pixel values of the second pixel row to consecutive memory locations of the second memory sub-block 582 and all Blue pixel values of the second pixel row to consecutive memory locations of the second memory sub-block 592. The planarizer 410 writes the Green pixels and the Blue pixels of each even numbered pixel rows simultaneously, similar to the writing of odd numbered pixels described above. For example, while the Green pixels are written via DMA1 channel to sub-block 582, the Blue pixels are simultaneously written via DMA2 channel to sub-block 592.

The planarizer 410 repeats the process of converting the Bayer data 510 into the four-plane data 550 by writing the data one pixel row at a time until all pixel rows of the Bayer data 510 are converted into the four-plane data 550. For example, the planarizer 410 writes data via DMA1 channel to the sub-blocks 581, 582, 583, and 584 for the first four pixel rows of the Bayer data 510, where the sub-blocks 581 through 584 are all part of the first memory block 580. The planarizer 410 also writes data via DMA2 channel to the sub-blocks 591, 592, 593, and 594 for the first four pixel rows of the Bayer data 510, where the sub-blocks 591 through 594 are all part of the second memory block 590. In practice, the number of sub-blocks included within each of the first memory block 580 and the second memory block 590 equals the number of pixel rows of the Bayer data 510.

Each plane of image data spans multiple sub-blocks. Sub-blocks 581 and 583 represent the red R plane of image data. Sub-blocks 582 and 584 represent the green Gb plane of image data. Sub-blocks 591 and 593 represent the green Gr plane of image data. Sub-blocks 592 and 594 represent the blue B plane of image data.

Additionally, the planarizer 410 can read the four-plane data 550 from the memory via the two DMA channels, DMA1 and DMA2. The process of reading the four-plane data 550 and converting the data into the Bayer data 510 is inverse of the process of converting the Bayer data 510 to the four-plane data 550 as described above. For example, the planarizer 410 reads the image data at the first sub-block 581 of the first memory block 580 via DMA1 and reads the image data at the first sub-block 591 of the memory block 590 via DMA2 to create the first pixel row of the Bayer data 510.

The planarizer 410 reads the image data corresponding to all Red pixels stored in the sub-block 581 via DMA1 in a single read operation. The planarizer 410 also reads the image data corresponding to all Green (Gr) pixels stored in the sub-block 591 via DMA2 in a single read operation. The image data of the sub-blocks 581 and 591 is buffered at buffers, DMA buffer 414 and DMA buffer 416, via DMA interfaces 416 and 417 while the planarizer 410 is reading the data. The buffered image data is used to reconstruct the first pixel row of the Bayer data 510 by using alternating data from the two buffers. For example, odd position pixels of the first pixel row of the Bayer data 510 are reconstructed from the pixel data of the buffered data at DMA buffer 414, which corresponds to the Red pixels read from the sub-block 581. Even position pixels of the first pixel row of the Bayer data 510 are reconstructed from the pixel data of the buffered data at DMA buffer 415, which corresponds to the Green (Gr) pixels read from the sub-block 591.

Next, the planarizer 410 reads the image data at the second sub-block 582 of the first memory block 580 via DMA1 and the second sub-block 592 of the memory block 590 via DMA2 to create the second pixel row of the Bayer data 510, similar to the first pixel discussed above. The planarizer 410 reads the image data corresponding to all Green (Gb) pixels stored in the sub-block 582 via DMA1 in a single read operation. The planarizer 410 also reads the image data corresponding to all Blue pixels stored in the sub-block 592 via DMA2 in a single read operation. The image data of the sub-blocks 582 and 592 is buffered at buffers, DMA buffer 414 and DMA buffer 416, via DMA interfaces 416 and 417 while the planarizer 410 is reading the data. The buffered image data is used to reconstruct the second pixel row of the Bayer data 510 by using alternating data from the two buffers. For example, odd positioned pixels of the second pixel row of the Bayer data 510 are reconstructed from the pixel data of the buffered data at DMA buffer 414, which corresponds to the Green (Gb) pixels read from the sub-block 582. Even positioned pixels of the first pixel row of the Bayer data 510 are reconstructed from the pixel data of the buffered data at DMA buffer 415, which corresponds to the Blue pixels read from the sub-block 592. The planarizer 410 repeats the process of reading image data stored in the sub-blocks to create the pixel rows of the Bayer data 510 for all sub-blocks of the four-plane data 550.

Figure 6:
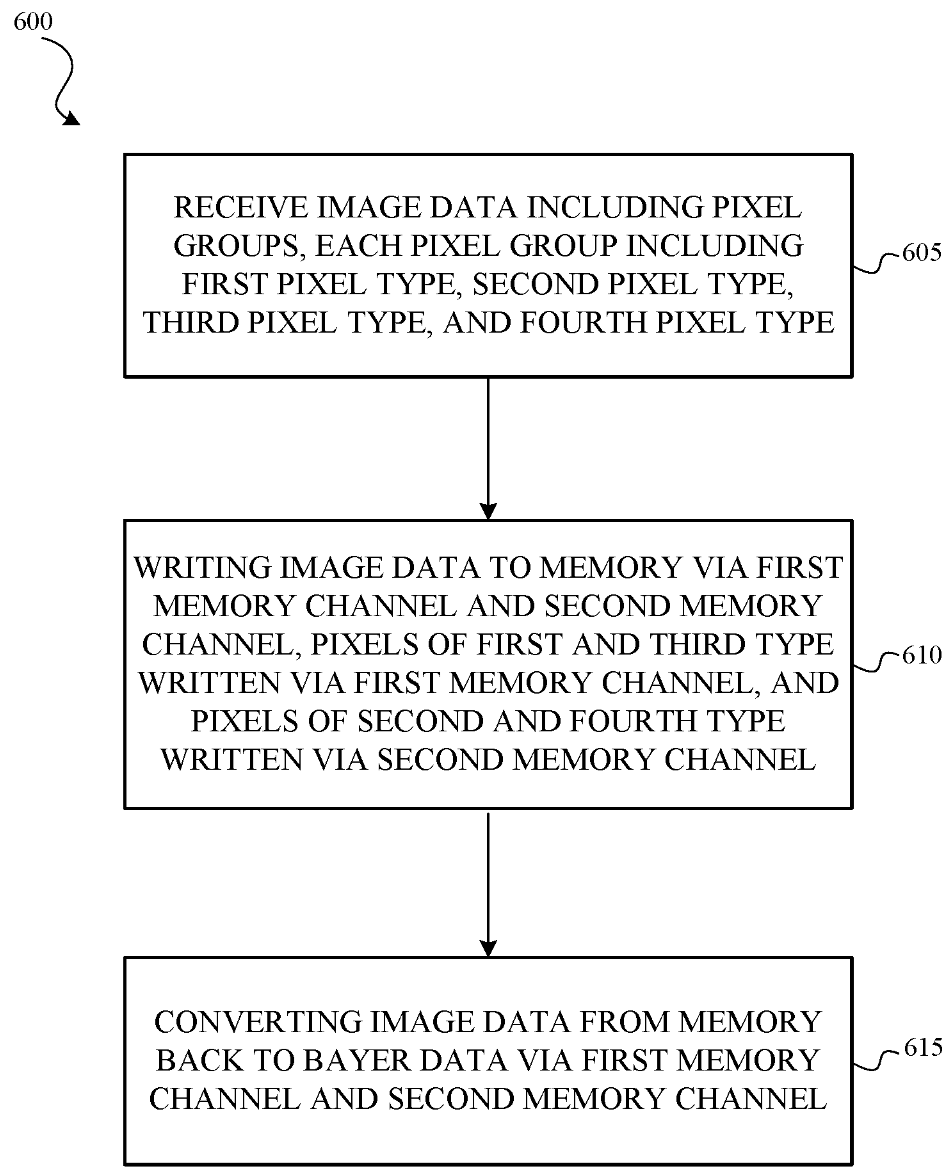
FIG. 6 is a flowchart illustrating a method of converting image data from Bayer data format to four-plane data format, according to one embodiment.

FIG. 6 is a flowchart illustrating a method of converting image data from Bayer data format to four-plane data format, according to one embodiment. The steps of the method 600 are performed by the planarizer 410. In some embodiments, each step of the method 600 may be performed by a separate circuit or module within the planarizer 410.

The planarizer 410 receives 605 image data in a data format that includes multiple pixel groups, where each pixel group includes a first pixel type, a second pixel type, a third pixel type, and a fourth pixel type. For example, the received image data is in Bayer data format, where each pixel group includes Red, first Green Gr, Blue, and second Green Gb pixels such that the Red pixels are the first type of pixels (e.g., Red pixels 511 and 513) of FIG. 5, Green pixels Gr of odd pixel rows are the second type of pixels (e.g., Green pixels 512 and 514), Green pixels Gb of even pixel rows are the third type of pixels (e.g., Green pixels 521 and 523), and the Blue pixels are the fourth type of pixels (e.g., Blue pixels 522 and 524).

The planarizer 410 writes 610 image data to a memory via a first memory channel and a second memory channel, where the pixels of the first type (e.g., R) and the third type (e.g., Gb) are written via the first memory channel, and the pixels of the second type (e.g., R) and the fourth type (e.g., Gr) are written via the second memory channel. For example, the planarizer 410 writes pixel data corresponding to the Red pixels 511 and 513, and the Green pixels 521 and 523 via the first memory channel, DMA1. The planarizer 410 also writes pixel data corresponding to the Green pixels 512 and 514, and the Blue pixels 522 and 524 via the second memory channel, DMA2. The planarizer 410 repeats the step 610 for all pixel rows of the Bayer data 510 as discussed above with reference to FIG. 5.

In some embodiments, the planarizer 410 also reads the four-plane data 550 and converts 615 the data into the Bayer data 510. The planarizer 410 reads the four-plane data 550 stored at memory 420 as four separate planes of data. For example, the four-plane data 550 corresponding to the first pixel row of the Bayer data 510 is stored at sub-blocks 581 and 592 such that sub-block 581 stores Red pixel data and sub-block 591 stores Green (Gr) pixel data. The four-plane data 550 corresponding to the second pixel row of the Byer data 510 is stored at sub-blocks 582 and 592 such that sub-block 582 stores Green (Gb) pixel data and sub-block 592 stores Blue pixel data. The planarizer 410 reads the stored four-plane data 550 in order to create pixel rows of the Bayer data 510. To create the first pixel row of the Bayer data 510, the planarizer 410 reads the image data corresponding to all Red pixels stored in the sub-block 581 via DMA1 and reads image data corresponding to all Green (Gr) pixels stored in the sub-block 591 via DMA2. The read image data from the sub-blocks 581 and 591 is buffered and used to reconstruct the first pixel row by using alternating data from the two buffers as described above with reference to FIG. 5. The planarizer 410 creates the second pixel row of the Bayer data 510 by reading the image data corresponding to all Green (Gb) pixels stored in the sub-block 582 via DMA1 and image data corresponding to all Blue pixels stored in the sub-block 592 via DMA2. The read image data from the sub-blocks 582 and 592 is buffered and used to reconstruct the second pixel row by using alternating data from the two buffers as described above with reference to FIG. 5. As described above with reference to FIG. 5, the planarizer 410 repeats the process of reading image data stored in the sub-blocks to create the pixel rows of the Bayer data 510 for all sub-blocks of the four-plane data 550.

FIGS. 7A-7C illustrate modified Bayer image data formats, according to one embodiment. The image data formats illustrated in FIGS. 7A-7C are modified versions of the Bayer data format discussed above with reference to FIGS. 5 and 6. The image data in any of the modified Bayer data formats depicted in FIGS. 7A-7C may be converted into the four-plane data as described above with reference to FIGS. 5 and 6, for further image processing.

FIG. 7A depicts a modified Bayer format where the pixels of the third type in the Bayer format (i.e., Green pixels of even pixel rows) are replaced with a White pixel W. This image format is known as RGBW Bayer. Data corresponding to the White pixel is captured without a color filter and such data corresponds to light associated with all colors, as opposed to a Green pixel representing only Green color image data. Replacing the Green pixels of the even pixel rows with the White pixels increases the luminance of the images captured by the image sensor. Alternatively, the pixels of the second type (i.e., Green pixels of odd pixel rows) may be replaced with the White pixels.

FIG. 7B depicts a modified Bayer format where the pixels of the third type in the Bayer format (i.e., Green pixels of even pixel rows) are replaced with an infrared (IR) pixel. Data of the IR pixel represents light in the infrared spectrum. Alternatively, the pixels of the second type (i.e., Green pixels of odd pixel rows) may be replaced with the IR pixels.

FIG. 7C depicts a modified Bayer format where an order of the pixel types within the Bayer data format are modified. For example, while the original Bayer data includes RGrRGrRGr pattern of pixels in odd pixel rows and GbBGbBGbB pattern of pixels in the even pixel rows, the modified Bayer format of FIG. 7C includes RGrRGrRGr pattern of pixels in the odd pixel rows and GbBGbBGbB pattern of pixels in the even pixel rows. In alternate embodiments, other orderings of the pixel types may be formed to modify the Bayer format further.

Three Sensor Data to Bayer Format

Figure 8:
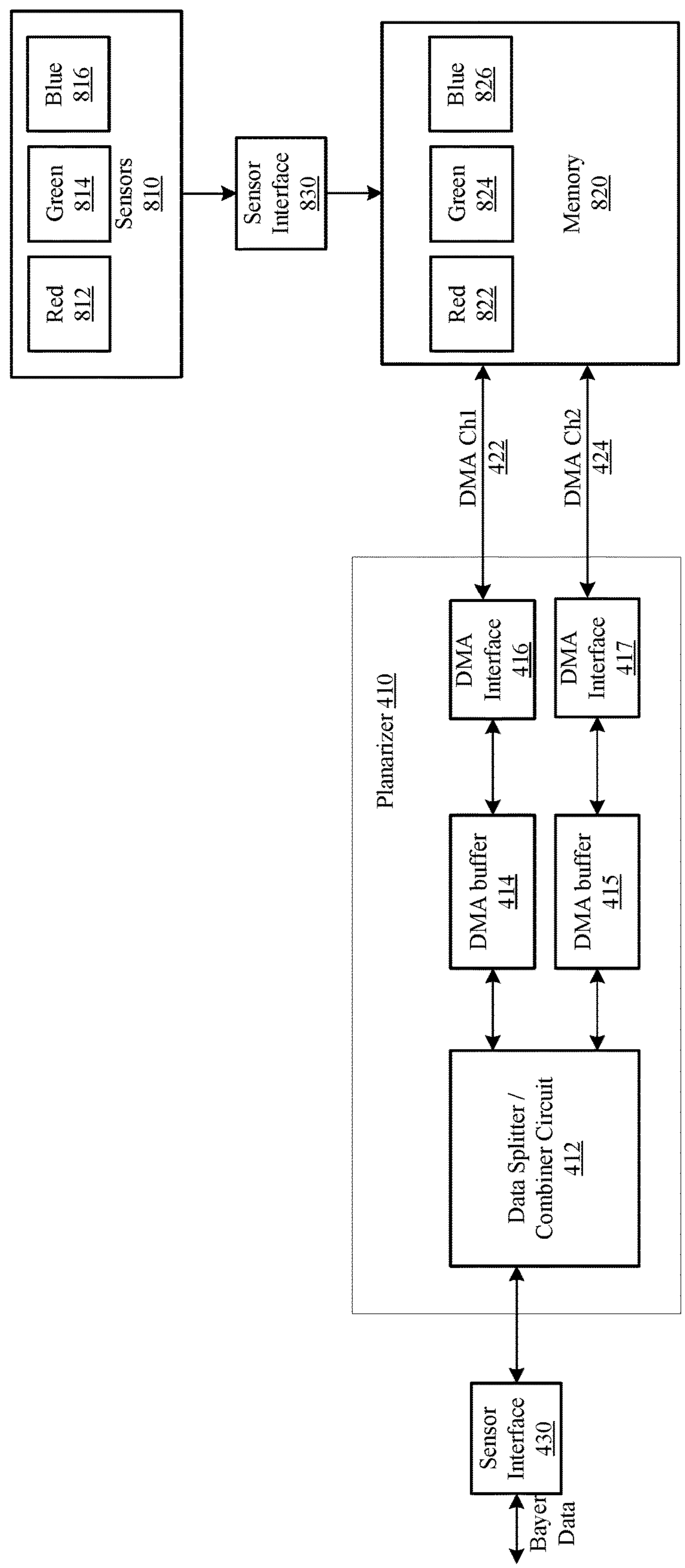
FIG. 8 is a block diagram illustrating conversion of image data from three sensor data format to Bayer data format, according to one embodiment.

FIG. 8 is a block diagram illustrating conversion of image data from three sensor data format to Bayer data format, according to one embodiment. The block diagram of FIG. 8 is similar to the block diagram of FIG. 4 except for the memory 820, sensors 810, and sensor interface circuit 830. The sensors 810 includes three individual color sensors: a Red sensor 812 for sensing Red image data, a Green sensor 814 for sensing Green image data, and a Blue sensor 816 for sensing Blue image data. Each color sensor may be implemented by a separate charge coupled device (CCD). A prism (not shown) receives incoming light and directs the red, blue, and green colors toward the corresponding color sensors. The sensor interface circuit 830 is an interface that may be substantially similar to the sensor interface circuit 430 described above with reference to FIG. 4. The sensor interface circuit 830 receives image data from either the sensors 810 and sends the received image data to the memory 820.

The image data format for images captured by the three sensors is shown in FIG. 9 as Red sensor data 910, Green sensor data 920, and Blue sensor data 930. The image data from each of the three sensors is stored in the memory 820 in separate memory blocks such as Red block 822 for Red sensor data, Green block 824 for Green sensor data, and Blue block 826 for Blue sensor data via the sensor interface 830. The planarizer 410 converts the image data in the three sensor data format to the Bayer data format using two memory channels, DMA1 and DMA2, as described below with reference to FIG. 9. The resulting Bayer image can then be passed to another circuit stage that processes the image using image processing tasks that are specifically designed for use with Bayer images. As a result, existing image processing techniques can be re-used to process image data from a three color sensor camera.

FIG. 9 is a block diagram illustrating additional details for converting image data from three sensor data format to Bayer data format, according to one embodiment. FIG. 9 shows Red sensor data 910, Green sensor data 920, and Blue sensor data 930, Bayer data 950, and the two DMA channels, DMA1 and DMA2.

The planarizer 410 converts the Red sensor data 910, the Green sensor data 920, and the Blue sensor data 930 to the Bayer data 950 via two DMA channels, DMA1 and DMA2. The Bayer data 950 has the same data format as that of the Bayer data 510 described above with reference to FIG. 5. The Bayer data 950 includes a plurality of pixel rows and pixel columns such that the odd numbered pixel rows include alternate Red and Green Gr pixels, and the even numbered pixel rows includes alternate Green Gb and Blue pixels.

The planarizer 410 generates the first odd numbered pixel row (i.e., first pixel row) of the Bayer data 950 as follows. The planarizer 410 reads the pixel data corresponding to the first pixel row of the Red sensor data 910 and the first pixel row of the Green sensor data 920, and combines the data from the two pixel rows to generate the first pixel row of the Bayer data 950 as described below. The DMA interface 416 reads the pixel data corresponding to the first Red pixel 911 of the Red sensor data 910 via DMA channel DMA1. The data splitter/combiner circuit 412 then writes the pixel 911 as the first pixel of the first pixel row of the Bayer data 950. The DMA interface 417 reads the pixel data corresponding to the first Green pixel 921 of the Green sensor data 920 via DMA channel DMA2. The data splitter/combiner circuit 412 then writes the pixel 921 as the second pixel of the first pixel row of the Bayer data 950. The data splitter/combiner circuit 412 writes pixel data corresponding to the first and second pixels of the first pixel row of the Bayer data 950 simultaneously via DMA channels, DMA1 and DMA2.

Next, the DMA interface 416 reads the pixel data corresponding to the second Red pixel 912 of the Red sensor data 910 via DMA channel DMA1. The data splitter/combiner circuit 412 then writes as the third pixel of the first pixel row of the Bayer data 950. The DMA interface 417 reads the pixel data corresponding to the second Green pixel 922 of the Green sensor data 920 via DMA channel DMA2. The data splitter/combiner circuit 412 then writes as the fourth pixel of the first pixel row of the Bayer data 950. The data splitter/combiner circuit 412 writes pixel data corresponding to the third and fourth pixels of the first pixel row of the Bayer data 950 simultaneously via DMA channels, DMA1 and DMA2. The planarizer 410 repeats the above-described steps of writing pixel data for adjacent Red and Green pixels of the first pixel row of the Bayer data 950 until the end of all pixel data corresponding to the first pixel rows of the Red sensor data 910 and the Green sensor data 920.

The planarizer 410 generates the first even numbered pixel row (i.e., second pixel row) of the Bayer data 950 as follows. The planarizer 410 reads the pixel data corresponding to the first pixel row of the Green sensor data 920 and the first pixel row of the Blue sensor data 930, and combines the data from the two pixel rows to generate the second pixel row of the Bayer data 950 as described below. The DMA interface 416 reads the pixel data corresponding to the first Green pixel 921 of the Green sensor data 920 via DMA channel DMA1. The data splitter/combiner circuit 412 then writes as the first pixel of the second pixel row of the Bayer data 950. The DMA interface 417 reads the pixel data corresponding to the first Blue pixel 931 of the Blue sensor data 930 via DMA channel DMA2. The data splitter/combiner circuit 412 then writes as the second pixel of the second pixel row of the Bayer data 950. The data splitter/combiner circuit 412 writes pixel data corresponding to the first and second pixels of the second pixel row of the Bayer data 950 simultaneously via DMA channels, DMA1 and DMA2. Next, the DMA interface 416 reads the pixel data corresponding to the second Green pixel 922 of the Green sensor data 920 via DMA channel DMA1. The data splitter/combiner circuit 412 then writes as the third pixel of the second pixel row of the Bayer data 950. The DMA interface 417 reads the pixel data corresponding to the second Blue pixel 932 of the Blue sensor data 930 via DMA channel DMA2. The data splitter/combiner circuit 412 then writes as the fourth pixel of the second pixel row of the Bayer data 950. The data splitter/combiner circuit 412 writes pixel data corresponding to the third and fourth pixels of the second pixel row of the Bayer data 950 simultaneously via DMA channels, DMA1 and DMA2. The planarizer 410 repeats the above-described steps of writing pixel data for adjacent Green and Blue pixels of the second pixel row of the Bayer data 950 until the end of all pixel data corresponding to the first pixel rows of the Green sensor data 920 and the Blue sensor data 930.

The planarizer 410 repeats the process of reading the pixel data corresponding to each pixel row of the Red sensor data 910 and the Green sensor data 920, and combining such data to generate each odd pixel row of the Bayer data 950 for all pixel rows of the Red sensor data 910 and the Green sensor data 920. For example, the first pixel rows of the Red sensor data 910 and the Green sensor data 920 are combined to generate the first pixel row of the Bayer data 950. The second pixel rows of the Red sensor data 910 and the Green sensor data 920 are combined to generate the third pixel row of the Bayer data 950. This process is repeated for all pixel rows of the Red sensor data 910 and the Green sensor data 920. Similarly, the planarizer 410 repeats the process of reading the pixel data corresponding to each pixel row of the Green sensor data 920 and the Blue sensor data 930, and combining such data to generate each even pixel row of the Bayer data 950 for all pixel rows of the Green sensor data 920 and the Blue sensor data 930. For example, the first pixel rows of the Green sensor data 920 and the Blue sensor data 930 are combined to generate the second pixel row of the Bayer data 950. The second pixel rows of the Green sensor data 920 and the Blue sensor data 930 are combined to generate the fourth pixel row of the Bayer data 950. This process is repeated for all pixel rows of the Green sensor data 920 and the Blue sensor data 930.

Figure 10:
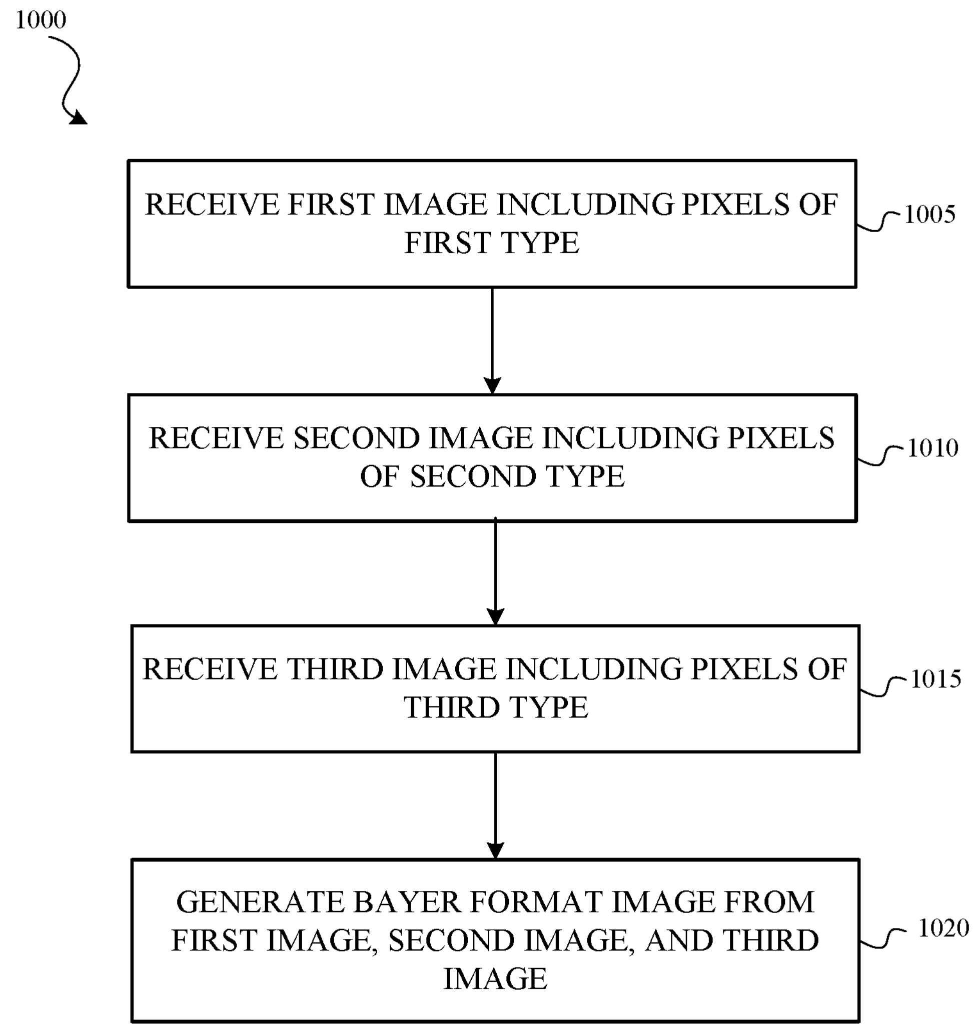
FIG. 10 is a flowchart illustrating a method of converting image data from three sensor data format to Bayer data format, according to one embodiment.

FIG. 10 is a flowchart illustrating a method of converting image data from three sensor data format to Bayer data format, according to one embodiment. The steps of the method 1000 are performed by the planarizer 410. In some embodiments, each step of the method 1000 may be performed by a separate circuit or module within the planarizer 410.

The planarizer 410 receives 1005 a first image that includes pixels of a first type. For example, the first image can be an image captured by a Red sensor (e.g., Red sensor data 910) with the pixels of the first type being Red pixels.

The planarizer 410 receives 1010 a second image that includes pixels of a second type. For example, the second image can be an image captured by a Green sensor (e.g., Green sensor data 920) with the pixels of the second type being Green pixels.

The planarizer 410 receives 1015 a third image that includes pixels of a third type. For example, the third image can be an image captured by a Blue sensor (e.g., Blue sensor data 930) with the pixels of the third type being Blue pixels.

The planarizer 410 generates 1020 a Bayer format image from the first image, the second image, and the third image. The planarizer 410 generates odd numbered pixel rows of the Bayer image by combining data corresponding to pixel rows of the first image and the second image as described above with reference to FIG. 9. The planarizer 410 generates even numbered pixel rows of the Bayer image by combining data corresponding to pixel rows of the second image and the third image as described above with reference to FIG. 9.

In one embodiment, a representation of the image processor or components within the image processor may be stored as data in a non-transitory computer-readable medium (e.g. hard disk drive, flash drive, optical drive). These representations may be, for example, behavioral level, register transfer level, logic component level, transistor level and layout geometry-level descriptions of the image processor.

The disclosure herein has been described in particular detail with respect to a few possible embodiments. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. An apparatus, comprising:
- an interface configured to receive an image in a format that comprises repeating pixel groups, each pixel group spread across a plurality of corresponding pixel rows and including:
  - a first pixel type and a second pixel type of a first pixel row; and
  - a third pixel type and a fourth pixel type of a second pixel row;
- a memory;
- a first memory channel connecting a circuit to the memory;
- a second memory channel connecting the circuit to the memory; and
- the circuit configured to write the image to the memory via the first memory channel and the second memory channel, pixels of the first pixel type in the image written to the memory via the first memory channel and pixels of the second pixel type in the image written to the memory via the second memory channel simultaneously at a first time, pixels of the third pixel type in the image written to the memory via the first memory channel and pixels of the fourth pixel type in the image written to the memory via the second memory channel simultaneously at a second time subsequent to the first time.

2. The apparatus of claim 1, wherein the format of the received image is a Bayer data format.

3. The apparatus of claim 1, wherein the first pixel type is a Red pixel, each of the second pixel type and the third pixel type is a Green pixel, and the fourth pixel type is a Blue pixel.

4. The apparatus of claim 3, wherein odd numbered pixel rows of the plurality of corresponding pixel rows comprise alternating Red and Green pixels, and wherein even numbered pixel rows of the plurality of corresponding pixel rows comprise alternating Green and Blue pixels.

5. The apparatus of claim 1, wherein the circuit is further configured to write odd position pixels of each pixel row of the image to the memory via the first memory channel and write even position pixels of each pixel row of the image to the memory via the second memory channel.

6. The apparatus of claim 1, wherein the memory further comprises:
- two separate address spaces, each address space comprising a plurality of sub-blocks, each sub-block to store a contiguous data corresponding to one pixel type of the image written to the memory, the one pixel type comprising one of the first pixel type, the second pixel type, the third pixel type, and the fourth pixel type.

7. The apparatus of claim 1, wherein the circuit is further configured to:
- read pixels of the first pixel type and the third pixel type via the first memory channel;
- read pixels of the second pixel type and fourth pixel type via the second memory channel; and
- convert the read pixels to an image in the format that comprises repeating pixel groups, wherein the format is a Bayer format.

8. A method, comprising:
- receiving, by a circuit connected to a memory via a first memory channel and a second memory channel, image data corresponding to the image being in a format that includes repeating pixel groups, each pixel group spread across a plurality of corresponding pixel rows and including:

a first pixel type and a second pixel type of a first pixel row; and a third pixel type and a fourth pixel type of a second pixel row; and writing, with the circuit, the image data to the memory via the first memory channel and the second memory channel, pixels of the first pixel type in the image written to the memory via the first memory channel and pixels of the second pixel type in the image written to the memory via the second memory channel simultaneously at a first time, pixels of the third pixel type in the image written to the memory via the first memory channel and pixels of the fourth pixel type in the image written to the memory via the second memory channel simultaneously at a second time subsequent to the first time.

9. The method of claim 8, wherein the format of the received image is a Bayer data format.

10. The method of claim 8, wherein the first pixel type is a Red pixel, each of the second pixel type and the third pixel type is a Green pixel, and the fourth pixel type is a Blue pixel.

11. The method of claim 10, wherein odd numbered pixel rows of the plurality of corresponding pixel rows comprise alternating Red and Green pixels, and wherein even numbered pixel rows of the plurality of corresponding pixel rows comprise alternating Green and Blue pixels.

12. The method of claim 8, further comprising, by the circuit, writing odd position pixels of each pixel row of the image to the memory via the first memory channel and writing even position pixels of each pixel row of the image to the memory via the second memory channel.

13. The method of claim 8, wherein the memory further comprises two separate address spaces, each address space comprising a plurality of sub-blocks, each sub-block to store a contiguous data corresponding to one pixel type of the image written to the memory, the one pixel type comprising one of the first pixel type, the second pixel type, the third pixel type, and the fourth pixel type.

14. The method of claim 8, further comprising, by the circuit:

reading pixels of the first pixel type and the third pixel type via the first memory channel;

reading pixels of the second pixel type and fourth pixel type via the second memory channel; and converting the read pixels to an image in the format that comprises repeating pixel groups, wherein the format is a Bayer format.

* * * * *